United States Patent [19]
Arsem

[11] Patent Number: 5,073,023
[45] Date of Patent: Dec. 17, 1991

[54] OVERHEAD PROJECTOR DISPLAY

[76] Inventor: Alvan D. Arsem, 25 Northledge Dr., Snyder, N.Y. 14226

[21] Appl. No.: 460,996

[22] Filed: Jan. 4, 1990

[51] Int. Cl.$^5$ .............................................. G03B 21/132
[52] U.S. Cl. ................................. 353/42; 353/DIG. 5; 353/122; 353/25
[58] Field of Search ................ 353/DIG. 5, 120, 122, 353/88, 97, 42, DIG. 2, DIG. 3, 108, 109, 121

[56] References Cited

U.S. PATENT DOCUMENTS

| | | | |
|---|---|---|---|
| 2,699,704 | 1/1955 | Fitz Gerald | 353/DIG. 3 |
| 3,343,452 | 9/1967 | Ackermann et al. | 353/42 |
| 3,482,910 | 12/1969 | Debelius | 353/42 |
| 3,510,214 | 5/1970 | Crow | 353/97 |
| 3,748,037 | 7/1973 | Külterer et al. | 353/97 |
| 3,785,729 | 1/1974 | Dasher | 353/DIG. 5 |
| 3,998,535 | 12/1976 | Clarke | 353/DIG. 5 |
| 4,057,337 | 11/1977 | Frank | 353/26 R |
| 4,275,525 | 6/1981 | Geisler et al. | 446/424 |
| 4,632,529 | 12/1986 | Levin | 353/DIG. 5 |
| 4,688,911 | 8/1987 | Simbal | 353/88 |
| 4,813,780 | 3/1989 | Solyntjes | 353/88 |
| 4,814,216 | 3/1989 | Brunett et al. | 353/DIG. 5 |
| 4,942,411 | 7/1990 | Polston | 353/DIG. 5 |
| 4,944,586 | 7/1990 | Rightmyre | 353/DIG. 3 |

FOREIGN PATENT DOCUMENTS

| | | | |
|---|---|---|---|
| 0006934 | 1/1985 | Japan | 353/42 |
| 1453829 | 10/1976 | United Kingdom | 353/42 |

Primary Examiner—William A. Cuchlinski, Jr.
Assistant Examiner—William C. Dowling
Attorney, Agent, or Firm—Robert M. Wolters

[57] ABSTRACT

An overhead projector for transparencies is provided, and includes a conventional top glass or other transparent plate. The overhead projector also includes a conventional optical system including a projection light path. An additional glass or the like plate is supported above the top conventional glass plate and supports a transparency for projection. A masking member is provided either above or below the transparency. The masking member is movable to cover portions of the transparency while uncovering other portions thereof to project selected portions of the transparency at any given time. In addition an arrow or other message carrying unit is provided which may be above or below the transparency, and which is movable to direct attention to a particular area of the transparency.

5 Claims, 3 Drawing Sheets

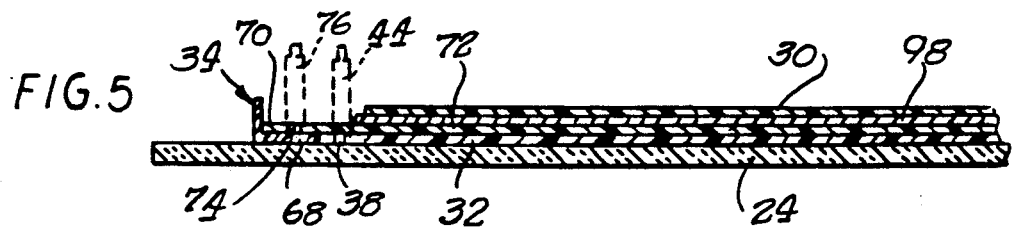
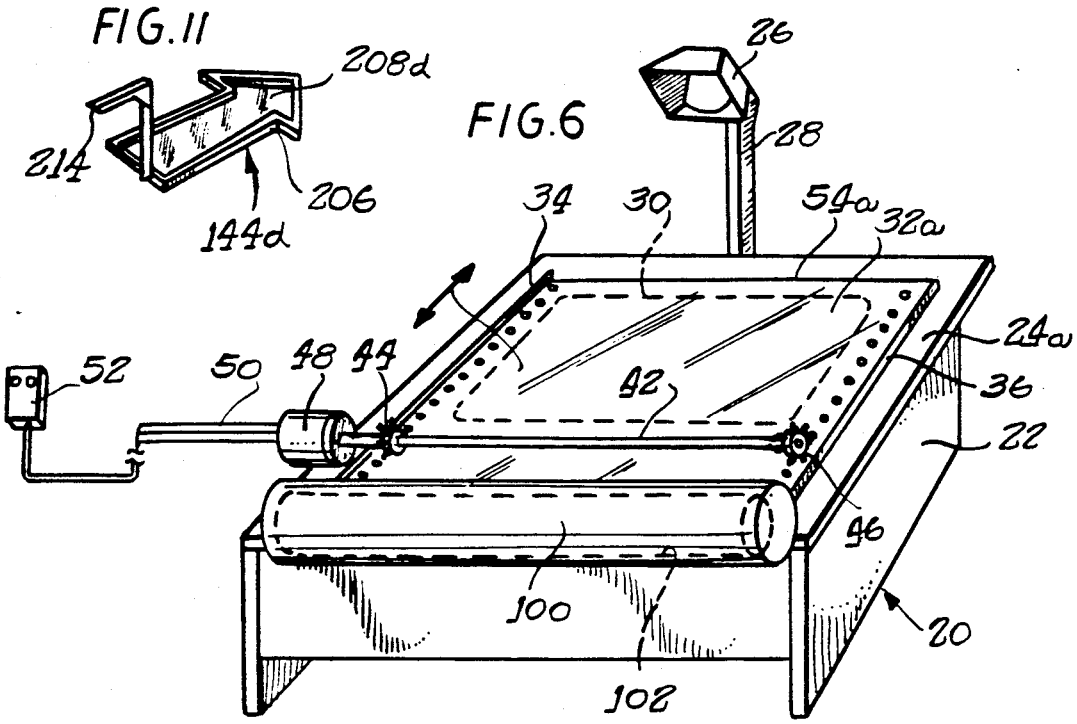
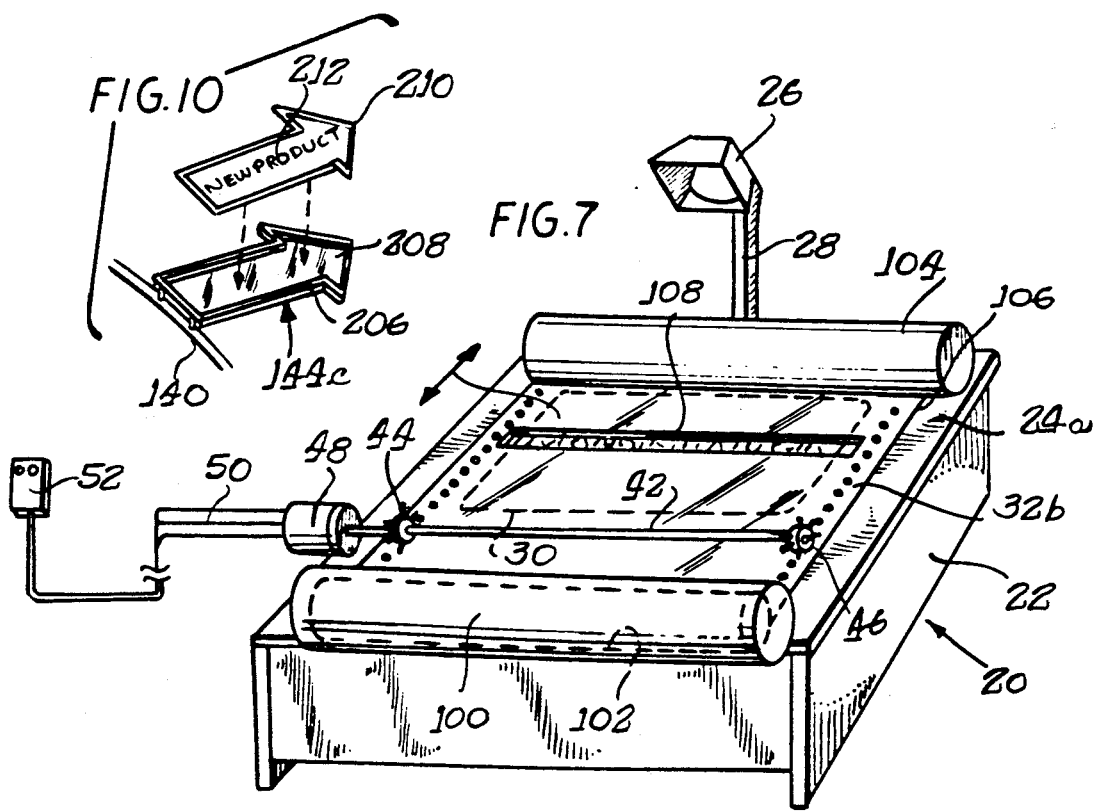

OVERHEAD PROJECTOR DISPLAY

BACKGROUND OF THE INVENTION

Overhead projectors are well known, and are widely used in teaching, in sales presentations, and in other applications in which a visual display is desired.

Overhead projectors generally comprise a glass table or horizontal support with a light underneath, and with an overhead optical system including a mirror and a projection lens. A transparency is laid on the glass table, and an enlarged image of the transparency is projected onto a vertical display screen or the like.

The person with the projected image generally wishes to take it up step by step to present information in an orderly sequence. Unfortunately, many viewers of the display, whether they be prospective purchasers or students, tend to read the material faster than the presenter wishes. Thus, at least some of the viewers do not receive the visual material and the oral lecture at the same time.

OBJECTS AND SUMMARY OF THE PRESENT INVENTION

Accordingly, it is an object of the present invention to provide a cover/uncover device for use with an overhead projector which causes the material being displayed to be seen only bit by bit, as desired by the user.

It is additionally an object of the present invention to provide an arrow to be displayed along with the transparency, which arrow is movable over the surface of the transparency being displayed, and rotatable to call attention to desired material. The arrow may carry a message or information.

In carrying out the foregoing and other objects of the present invention I provide an opaque or translucent sheet of material that initially overlies the transparency optically. It may physically be either above or below the transparency, and is movable parallel to the transparency to display the material thereon incrementally, first covering the entire transparency, and then uncovering it line by line or according to some other desired pattern. In addition, an arrow or pointer is also translatable parallel to the transparency, either above or below it, and this arrow may also be rotatable so as to emphasize material to which it is desired to call special attention. The arrow may carry an insertable message. In one embodiment of the invention material that previously has been displayed is again covered so that emphasis is only on a particular bit of information being disclosed at a given time.

THE DRAWINGS

The present invention will best be understood from the following specification when taken in connection with the accompanying drawings wherein:

FIG. 5 is a vertical cross section through the supporting glass table of the overhead projector and overlying parts;

FIG. 6 is a view similar to FIG. 1 showing a modification of the invention;

FIG. 7 is a perspective view generally similar to FIG. 1 and illustrating a modification of the invention;

FIG. 10 is a perspective view showing a detail of the arrow; and

FIG. 11 is a view generally similar to FIG. 10 and showing a modification.

DETAILED DISCLOSURE OF THE ILLUSTRATIVE EMBODIMENTS

Figure 1:
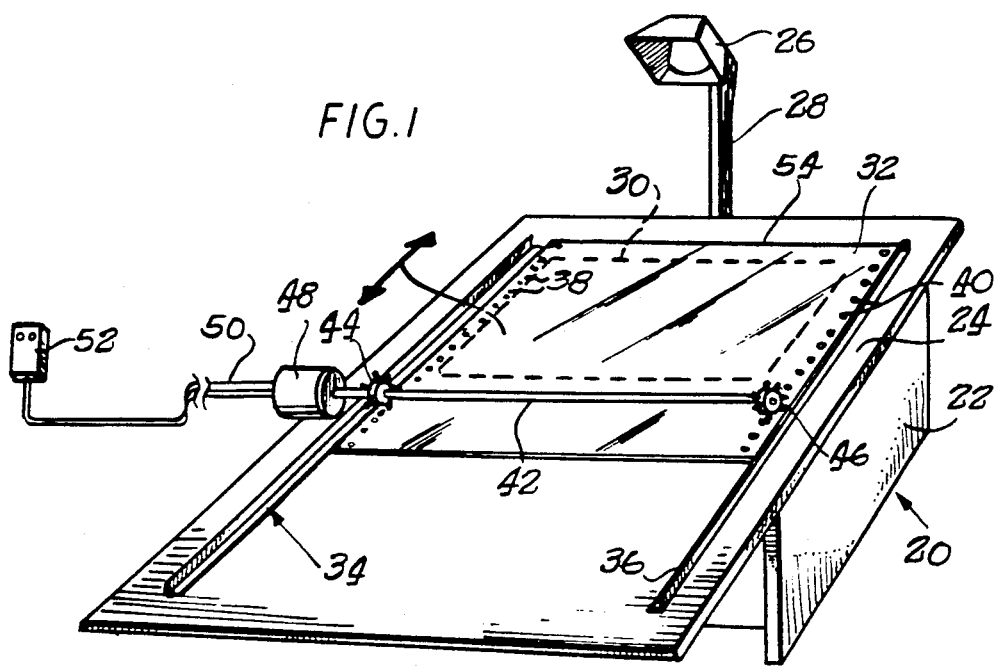
FIG. 1 is a perspective view of an overhead projector constructed in accordance with the principles of the present invention.

Referring now in greater particularity to the drawings, and first to FIG. 1, there will be seen a conventional overhead projector designated generally by numeral 20. The overhead projector 20 has at the top a glass or other transparent plate, which may have a frame, of conventional construction, and includes a base or body 22 having a light source therein. In accordance with the present invention the top is covered by an overlay glass plate 24, suitably secured over the ordinary overhead projector top plate extending to one side (lower left in FIG. 1) from the body. In addition, the overhead projector includes the usual overhead optical unit 26 including a lens and reflector, and supported on a vertical standard 28 extending up from the body 22 of the conventional projector.

A transparency to be projected is shown in broken lines at 30. In prior art use of overhead projectors this transparency would lie directly on the upper glass surface 24. However, as will appear presently, it is on a glass or other transparent surface disposed above the glass surface 24 in accordance with the present invention.

An important distinction of the present invention relative to the prior art is that a plastic sheet 32 lies on top of the glass sheet 24. This sheet is rather thin, being on the order of 1/16th of an inch thick, and it is opaque or semi-opaque, and it may be colored if so desired. The sheet lies between two angle guides 34 and 36 which are suitably secured on the upper surface of the glass plate 24. The sheet 32 is movable along the guides 34 and 36, and to this end the sheet is provided with parallel rows of holes or perforations 38 and 40 relatively adjacent the opposite sides and adjacent the guides 34 and 36. A shaft 42 overlies the opaque sheet 32 and is provided with a pair of wheels 44 and 46 having radially extending pins respectively engagable with the holes 38 and 40. The shaft 42 is driven by an electric motor 48 controlled by a three wire cable 50 from a hand control unit 52. The motor can be a continuous motor or a stepping motor, and in any event, power is applied momentarily by a signal from the hand controller 52 to turn the shaft 42 far enough to advance the sheet 32 a predetermined distance. As the sheet is so advanced the trailing edge 54 thereof incrementally moves relative to the transparency 30, thereby selectively exposing increments of material appearing on the transparency. Thus, the audience will see only what the person making a presentation with the aid of the overhead projector wishes the audience to see. It is not possible for the audience to read ahead, and thus to divert from the oral presentation of the speaker.

Figure 2:
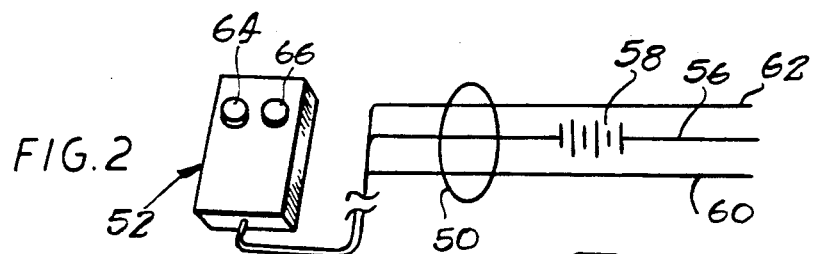
FIG. 2 is a schematic wiring diagram illustrating a principle of electrical operation of the present invention.
Figure 2A:

The cable 50 (FIG. 2) includes three wires. The first wire 56 is connected to power source 58. This may be a battery housed within the hand unit 52, or it may be a solar cell 58a (FIG. 2A) disposed at an appropriate place on the overhead projector 20 to receive light therefrom to provide power. The cable 50 also includes two additional wires 60 and 62. The hand set or unit 52 is provided with two push button switches 64 and 66. One of the switches 64 connects the powered wire 56 with one of the other wires 60, 62, while the switch 66 connects the other of the two wires 60, 62 to the powered wire 56, thus to run the motor 48 either forward or backwards. Accordingly, the sheet 32 can be either advanced to clear portions of the transparency, such as line by line, or moved rearwardly. Normally it would advanced step by step to sequentially clear the entire transparency 30, and in due course the sheet 32 would be reversely moved to its original position as shown in FIG. 1. However, there might be times when it would be desired to re-cover a portion of the transparency or to direct attention to a particular line, and in this instance the sheet would be backed up one or more increments toward its original position.

Figure 3:
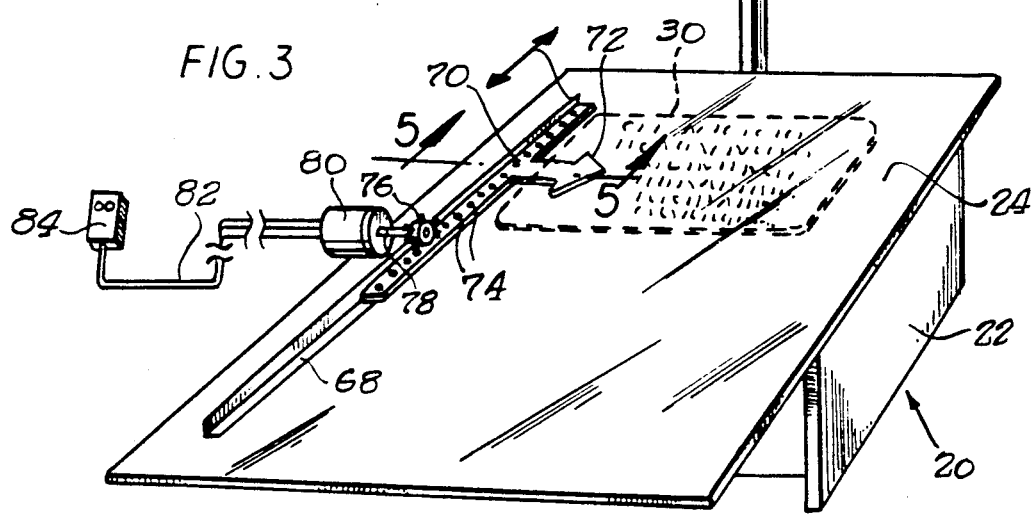
FIG. 3 is a view similar to FIG. 1 showing the arrow feature of the present invention.

A further aspect of the present invention is illustrated in FIG. 3. The parts of the overhead projector 20 are shown and numbered as before, and the transparency again is shown in broken lines. There is an additional track 68 along the left edge of the top support or glass 24 on which an elongated member 70 rides, having a laterally projecting arrow 72. The arrow preferably is of colored plastic, and can be run back and forth to call attention to particular aspects of the material being illustrated. A row of spaced holes or perforations 74 is provided in the elongated member 70, and a wheel 76 having pins therein interfits with the holes and is mounted on the shaft 78 of a reversible motor 80, which may be a continuous motor or a stepping motor. The motor is controlled by a cable 82 from a handset or unit 84.

As will be apparent the guides 34 and 68 must be offset from one another so that the pinwheels 44 and 76 respectively cooperate only with the holes with which they are supposed to cooperate.

Figure 4:
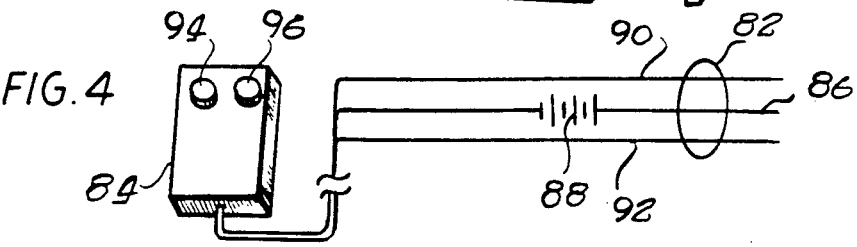
FIG. 4 is a schematic wiring diagram similar to FIG. 1 showing wiring operable with the arrow feature.

The electrical aspects of the cable and hand unit 84 are illustrated in FIG. 4, and it will be seen that the cable 82 includes a central wire 86 incorporating a power source 88. Again, this may be a battery within the hand unit 84, or it may be a solar cell exposed to light from the overhead projector. There are two additional wires 90 and 92 connected to motor to run it forward or backward, and two push button switches 94 and 96 incorporated in the handset selectively connect the powered center wire 86 with the outside wires 90 and 92 for forward and backward operation and movement of the arrow 72 in opposite directions. It would be apparent to those skilled in the art that the power units 58 and 88 could be a common power unit, and that the hand units 52 and 84 could be a common unit, with four push buttons included in the common unit for respective control of the motors 48 and 80.

The overlying nature of the various parts, and relative disposition of parts will be seen with reference to FIG. 5. The guide 68 will be seen to be a horizontal flange on the angle guide 34, and the edge of the sheet 32 will be seen to abut the edge of this flange. The pinwheel 44 is shown in phantom, since it is downstream from the area where the section line 5—5 is taken, but it is shown to illustrate that it is somewhat toward the center line of the glass 24, clearing the flange 68. The elongated member 70 lies on top of the flange 68, and the pinwheel 76 also is shown in phantom, so that it will be seen that this pinwheel overlies the flange and cooperates with the holes in the elongated member 74. The axis of this wheel is slightly higher than that of the pinwheel 44, and it will be seen that the pinwheel 44 is spaced sufficiently toward the center line of the glass support 24 to clear the elongated member 70. A glass support or overlying table 98 is supported in any suitable fashion and overlies the arrow 72 and elongated member 70, the transparency 30 being supported on this glass 98. The arrow could equally well be above the transparency, and there are some advantages to such positioning for inserting a message, or in manual movement of the arrow. In addition to the axial spacing of the pinwheels 44 and 76, it will be understood that the pinwheel 44, and its coaxial pinwheel 46 are spaced downstream (away from the support 28) relative to the pinwheel 76 to provide greater clearance for the arrow 72, permitting it to be moved completely beyond the transparency without engaging the wheel 44.

A further embodiment of the invention is shown in FIG. 6. Most of the parts are identical with those heretofore shown, and are identified by the same numerals. The sheet previously numbered as 32 is slightly modified, and parts thereof are identified by similar numerals with the addition of the suffix a. Thus, the sheet is identified as 32a, and the trailing or uncovering edge thereof is identified as 54a. The distinction is that the glass tabletop 24a need not be extended as it was in FIGS. 1 and 3, and there is a tubular housing 100 mounted at the downstream (opposite to the support 28) end of the table. There is a slot in this tubular member 100 substantially at the level of the glass table 24a, and as the sheet 32a is fed downstream it curls up at 102 within the tubular storage member 100. The sheet also moves out of this tubular member when it is moved toward its initial position, i.e. the position shown in FIG. 6.

A further embodiment of the invention is shown in FIG. 7. This embodiment is very similar to that of FIG. 6, and similar part numbers are used to the extent that the parts are the same. A distinction lies in that at the upstream end (adjacent the support 28) there is provided a tubular supply storage member 104 having a slot 106 therein from which the sheet, now identified as 32b, feeds to the storage cylinder or tubular member 100. In this instance there is a transverse slot 106 in the sheet 32b so that only a part of the display is shown at any time. The part that previously has been referred to is covered up, along with the part that has not yet been reached. As will be understood, the slot 108 need not be a physical slot, but could be a clear slot of transparent or translucent plastic material, which could be colored. Such a transparent or translucent area could carry a message. There could be a plurality of such areas respectively carrying different messages. The large opaque area preceding the slot permits total covering of the transparency with accompanying blanking of the screen, thus affording an opportunity for transparency changing.

Figure 8:
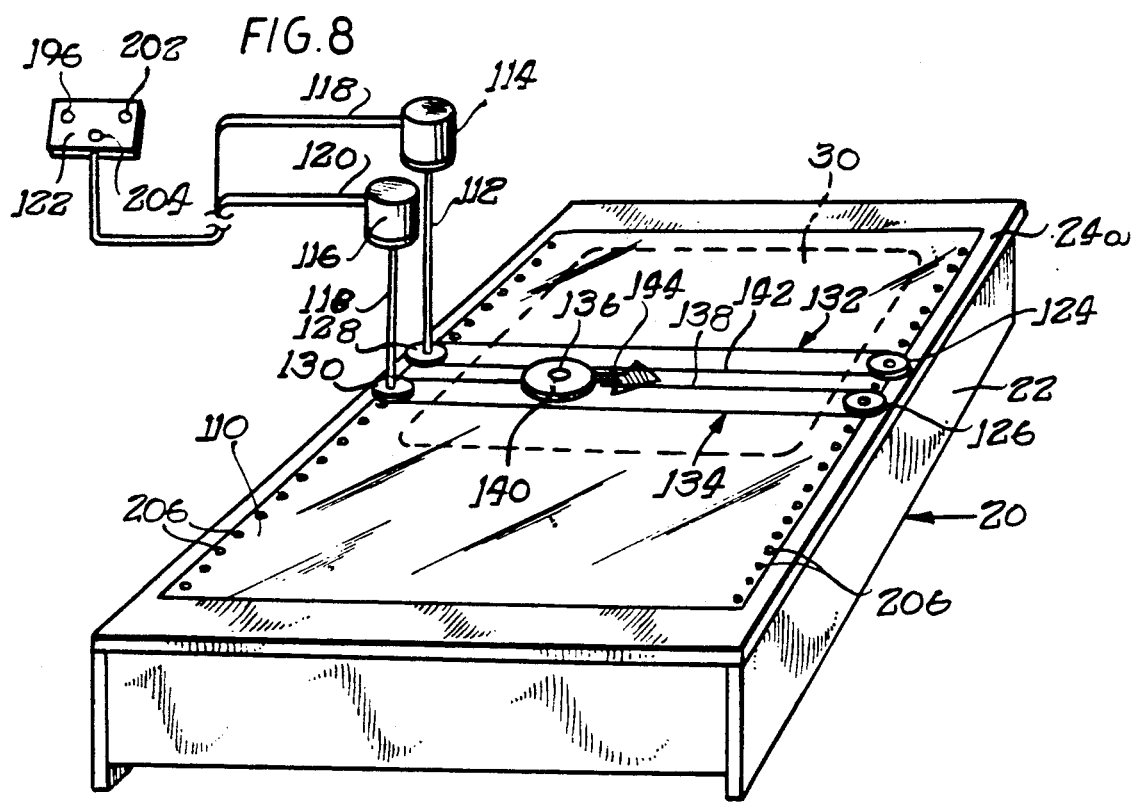
FIG. 8 is a perspective view generally similar to FIG. 1 and illustrating a modification of the arrow device.
Figure 9:
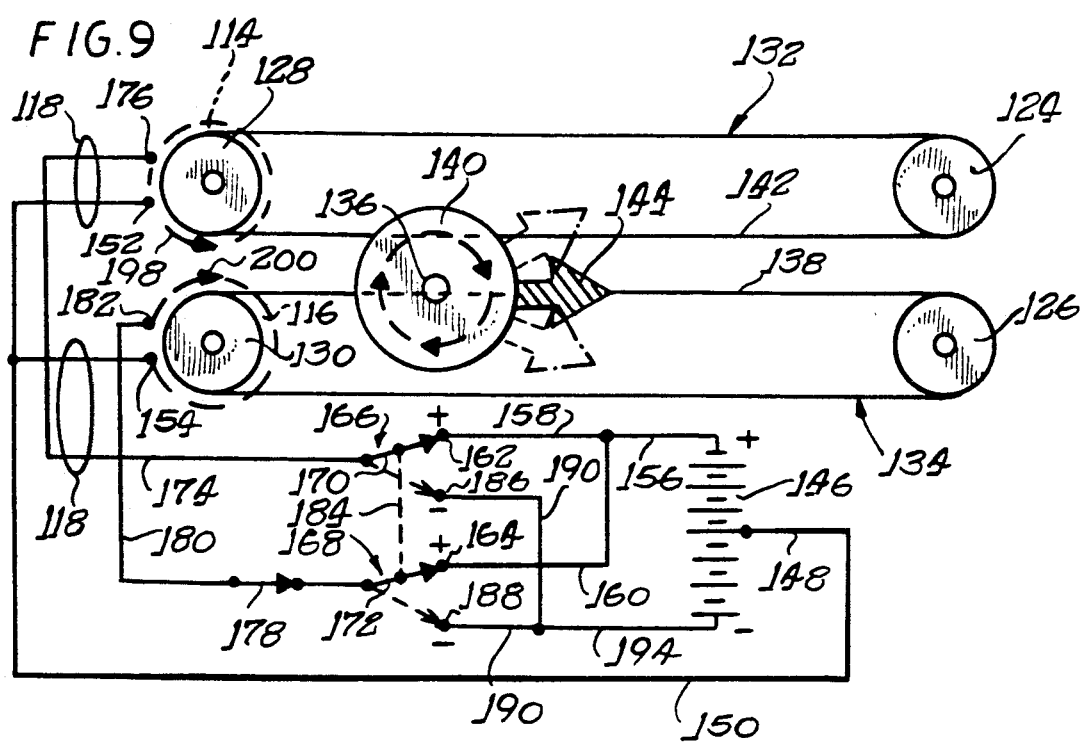
FIG. 9 is a somewhat schematic plan view showing operation of an improved form of the arrow device.

Additional aspects of the invention are shown in FIGS. 8 and 9. Certain parts of the overhead projector remain the same, and are identified by the same numerals. In addition, there is a rigid plastic sheet 110 which takes the place of the arrow and elongated member 72, 70 and which is shiftable longitudinally along the top glass 24a. Alternatively, there could be a surrounding or perimeter rigid frame. A pair of shafts 112 and 114 are supported by this sheet or frame 110. The shafts upstand to a particular desired height, and are connected to the output shafts of electric motors 114 and 116. Cables 118 and 120 connect the motors to a handset or unit 122.

A pair of pulleys 124 and 126 are rotatably mounted on shafts upstanding from adjacent the opposite side of the rigid plastic sheet or frame 110. A pulley 128 is fixed on the shaft 112 in lateral alignment with the pulley 124, while a pulley 130 is fixed on the shaft 118 in lateral alignment with the pulley 126. All four of the pulleys are in close proximity to the sheet or frame 110. A flexible cord 132 extends between the pulleys 124 and 128, while a flexible cord 134 is passed over the pulleys 126 and 130. A vertical shaft 136 is secured to the upper span or reach 138 of the cord 134, and a pulley 140 is rotatably mounted thereon. The adjacent span or reach 142 of the cord 132 passes once around the pulley 140. An arrow 144 extends substantially radially from the pulley 140. The pulley 140 preferably is of clear plastic to avoid covering any of the material on the transparency 30, while the arrow 144 preferably is of translucent colored plastic to aid in calling is of translucent colored plastic to aid in calling attention to desired part of the material on the transparency.

The operation of the structure of FIG. 8 will best be understood with reference to FIG. 9.

The motors 114 and 116 are shown in phantom in FIG. 9 for clarity of illustration, avoiding confusion with the pulleys 128 and 130. The two motors are identical, and may be precision stepping motors, or of other design that each will rotate exactly the same degree. A power source 146 is provided which may be a battery within the handset 122, or which may be a solar cell illuminated by the overhead projector 20. In any event, the power source 146 has a center tap 148 and a common line 150 leads from this center tap and is connected to the motors 114 and 116, respectively at 152 and 154. The positive end of the power source 146 is connected by a line 156 branching at 158 and 160 to the positive fixed contacts 162 and 164 of a pair of single pole double throw switches 166 and 168, respectively having movable switch contacts 170 and 172. The movable switch contact 170 is connected by a wire or other conductor 174 to the second connection 176 to the motor 114. The movable switch contact 172 is connected through a normally closed switch 178 and a line 180 to the second connection 182 to the motor 116. The two movable switch contacts 170 and 172 ganged by an insulating member 184, and are respectively movable in unison to engage fixed contacts 186 and 188. The fixed contacts 186 and 188 are connected by wires 190 and 192 to a common wire or line 194 leading to the negative end of the power source 146.

The switches 166 and 168 normally are open. When a pushbutton operator 196 on the handset is pushed the movable switch arms or contacts 170 and 172 are moved to the positive contacts 162 and 164 as shown in FIG. 9. This causes the motors 114 and 116 to run in opposite directions as indicated by the arrows 198 and 200. Both cord reaches 138 and 142 thus move to the right, shifting the pulley 140 to the right without rotation. If a second switch operator 202 on the handset is pressed, the movable switch arms 170 and 172 are moved to the broken line position shown in FIG. 9 engaging the negative contacts. This causes the motors to run in the opposite direction, and causes the two cord reaches 138 and 142 to move to the left, thus shifting the pulley 140 to the left. If a further switch operator 204 on the handset is pressed the switch 178 is opened. Closure of either of the switches 166 and 168 will then cause the cord reach 142 to move in one direction or the other, while the circuit to the second motor 116 is opened, whereby the pulley shaft 136 remains in fixed position. Due to the loop of the reach 142 about the pulley, this effects rotation of the pulley 140 in one direction or the other, thereby moving the arrow 148 rotationally up or down as shown by the broken line representations in FIG. 9. Accordingly, the arrow can be moved transversely in either direction and can also be rotated to cause it to point at any desired portion of the transparency display from any direction.

Longitudinal movement of the arrow and of the connected parts is effected by holes or perforations 206 engaged by corresponding tooth wheels as in previous figures. The entire sheet or frame 110 thus is shifted longitudinally.

A preferred construction of the arrow is shown in FIG. 10. The arrow again is connected to the pulley 140, but the arrow is specifically different, and thus is identified by the numeral 144c. The arrow includes a peripheral upstanding flange 206, and a floor 208 of transparent, preferably clear plastic material. An insertable arrow 210 of transparent, preferably colored plastic material fits on top of the floor 208 within the peripheral flange 206, and may carry a label 12 thereon directing attention to a particular feature of the transparency.

A further modification is shown in FIG. 11, wherein there is an arrow 144d which is like the arrow 146 in that it includes a flange 206d, and a floor 208d of transparent plastic, again preferably clear. However, the arrow 144d is not secured to a pulley, but rather has an upstanding L-shaped handle 214 for manual positioning of the arrow. Again, there is preferably an insert such as the insert 210 for adding a particular color or a particular label to call attention to a desired feature on the transparency.

Although reference has been made to an arrow, other shapes are contemplated for carrying messages, and the arrow should in general be considered to be a message carrying unit.

It is to be noted that the invention preferably utilizes an existing or conventional overhead projector to which parts are added without the necessity of otherwise modifying the projector.

The specific examples of the invention as herein shown and described will be understood as being exemplary only. Various changes in structure will no doubt occur to those skilled in the art, and will be understood as coming within the present invention insofar as they fall within the spirit and scope of the appended claims.

The invention is hereby claimed as follows:

1. Apparatus for projecting transparencies including a housing having means providing a projection light path, a projection optical system in said light path interconnected with said housing, means connected to said housing for supporting a transparency to be projected in said light path, masking means interconnected with said housing and disposed across said light path, and means for moving said masking means selectively to uncover portions of said transparency while covering other portions thereof and thus to project only selected portions of said transparency at any given time, and further including an indicating member disposed in said light path, means providing an axis of rotation for said member lying in said light path and oriented in the same direction as said light path, and means for moving said member rectilinearly and also rotationally about said axis of rotation to point at a selected area of said transparency from any direction to direct attention to a selected area of said transparency.

2. Apparatus as set forth in claim 1 wherein said indicating member comprises an arrow.

3. Apparatus as set forth in claim 1 and further including means for moving said indicating member independently of said masking means.

4. Apparatus as set forth in claim 1 and further including a display item, and means on said indicating member for replaceably carrying said display item for projection thereof.

5. Apparatus for projecting transparencies including a housing having means providing a projection light path, a projection optical system in said light path interconnected with said housing, means connected to said housing for supporting a transparency to be projected in said light path, masking means interconnected with said housing and disposed across said light path, and means for moving said masking means selectively to uncover portions of said transparency while covering other portions thereof and thus to project only selected portions of said transparency at any given time, and further including means for moving said member rectilinearly and also rotationally to direct attention to a selected area of said transparency, said indicating member comprising an arrow, and further including a peripheral flange on said indicating member and including a light transmitting area on said indicating member, and a display item fitting within said flange and aligned with said light transmitting area to project said display item.

* * * * *